(12) United States Patent
Ichikawa et al.

(10) Patent No.: US 6,560,410 B2
(45) Date of Patent: May 6, 2003

(54) IMAGE FORMING APPARATUS AND METHOD FOR CALIBRATING THE SAME

(75) Inventors: Koji Ichikawa, Saitama (JP); Makoto Tsugita, Saitama (JP); Tetsuro Ashida, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/864,177

(22) Filed: May 25, 2001

(65) Prior Publication Data

US 2001/0046381 A1 Nov. 29, 2001

(30) Foreign Application Priority Data

May 26, 2000 (JP) ........................ 2000-156920

(51) Int. Cl.⁷ .................... G03B 15/00; H04N 17/00
(52) U.S. Cl. .................... 396/2; 348/188; 348/207.2
(58) Field of Search ................. 396/2; 355/7; 358/519; 348/175, 180, 187, 188, 207.2

(56) References Cited

U.S. PATENT DOCUMENTS 5,809,366 A * 9/1998 Yamakawa et al. ......... 358/519
2001/0045980 A1 * 11/2001 Leonard ...................... 348/129

FOREIGN PATENT DOCUMENTS

| JP | 6-233179 | 8/1994 | .......... H04N/5/238 |
| JP | 10-63047 | 3/1998 | .......... G03G/15/00 |
| JP | 2000287093 A | * 10/2000 | ............ H04N/1/60 |

OTHER PUBLICATIONS

Patent abstracts of Japan 10–063047.
Patent abstracts of Japan 06–233179.

* cited by examiner

Primary Examiner—Russell Adams
Assistant Examiner—Arthur A Smith
(74) Attorney, Agent, or Firm—Sughrue Mion, PLLC

(57) ABSTRACT

A camera section photographs a camera test chart. A calibration controller of the camera section reads out image data of the camera test chart, and executes calibration of the camera section by use of characteristic values of obtained image data and standard data, which is stored in an internal memory. Next, a printer test chart, printed by a printer section, is photographed by the calibrated camera section. Image data of the printer test chart is sent to the printer section from the camera section. A calibration controller of the printer section performs calibration of the printer section by use of characteristic values of obtained image data and standard data, which is stored in an internal memory. By calibrating both the camera and the printer sections, it is possible to execute effective calibration of the apparatus.

34 Claims, 13 Drawing Sheets

IMAGE FORMING APPARATUS AND METHOD FOR CALIBRATING THE SAME

BACKGROUND OF THE INVENTION

1. Field of the Invention

The present invention relates to an image forming apparatus such as an identification photograph producing apparatus. More specifically, the present invention relates to the image forming apparatus capable of executing proper calibration of an imaging device and a printing device.

2. Background Arts

An identification photograph producing apparatus is well-known, in which an identification photograph for a driver's license and a passport is easily produced by putting a charge and making simple commands. In the identification photograph producing apparatus are provided a photographing room and a photo making chamber, which are parted by a partition wall. In the photographing room, there are a chair for sitting, lighting equipments, console panel and so forth. The photo making chamber has an image forming apparatus, wherein an imaging device and a printing device are incorporated.

In general, when imaging and printing characteristics of the image forming apparatus are varied, image quality of a print image is also varied. For instance, imaging characteristics of an electric still camera, used as the imaging device, are deviated by age-based deviation in an imaging element like a CCD image sensor, and by age-based deviation in the lighting equipments. Moreover, in the printing device, density characteristics of a print image are varied by deviation in recording sheets and print conditions (temperature, humidity and so forth). In order to keep image quality of the print image regardless of these age-based deviations and deviation in print and lighting conditions, it is needed to perform calibration of image forming apparatus in certain intervals, in each repair or parts exchange, and each supplement of recording sheets.

Japanese Laid-open Patent Publication (JP-A) No. 06-233179 discloses a photographing device in which diaphragm correction and color balance adjustment are executed in a period of absence of a person at a photographing position. Moreover, JP-A No. 10-063047 discloses an image forming device to monitor temperature, print number, toner amount and so forth, and to output a calibration request to a user when detecting age-based deviation, variation in temperature and so forth.

In the above devices, however, only the imaging device or the printing device is calibrated. Thus, when characteristics of the imaging device and the printing device are varied, it is not possible to have effective calibration.

SUMMARY OF THE INVENTION

In view of the foregoing, an object of the present invention is to provide an image forming apparatus to execute effective calibration by adjusting characteristics of both the imaging device and the printing device.

To achieve the above objects, an image forming apparatus of the present invention is comprised of photographing means for photographing a subject and outputting image data of a subject image, printing means for printing the subject image on the basis image data from photographing means, a first test chart used in calibration of photographing means, a second test chart used in calibration of printing means, and calibration means for correcting deviation in photography characteristics of photographing means and deviation in printing characteristic of printing means. Calibration means drives photographing means to photograph the first test chart, executes calibration of photographing means on the basis of image data of the first test chart, drives photographing means to photograph the second test chart that is printed by driving printing means, and executes calibration of printing means on the basis of image data of the second test chart.

In the preferred embodiment, the apparatus is changeable between a taking mode for photographing and printing a subject, and a calibration mode for carrying out calibration of photographing means and printing means. At least one of photographing means and printing means includes calibration means. The first and second test charts include plural gray patches. Optical densities of these gray patches are different from one another. Guide frames are provided to set the first and second test charts at appropriate positions.

In the taking mode, photographing means executes white balance correction process, flare correction process, and gamma conversion process, and printing means executes gray balance correction process and gradation conversion process. In the calibration mode, calibration means adjusts correction parameters used in white balance correction process, flare correction process, and gamma conversion process. Also, in the calibration mode, calibration means adjusts correction parameters used in gray balance correction process and gradation conversion process.

In an another embodiment, when calibration conditions to carry out calibration are satisfied, a calibration request is sent to a system management computer to urge calibration of the apparatus. Moreover, when a test chart exchange condition to exchange the first and second test charts is satisfied, a test chart exchange request signal is sent to the system management computer. Furthermore, when utilization suspension condition to suspend utilization in said taking mode, a utilization suspension signal is sent to the system management computer, and a message for notifying a user is displayed on a display of the apparatus.

It is possible to carry out calibration by photographing the first and second test charts after printing the second test chart, by executing calibration of photographing means on the basis of image data of the first test chart, and by executing calibration of printing means on the basis of image data of the second test chart.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
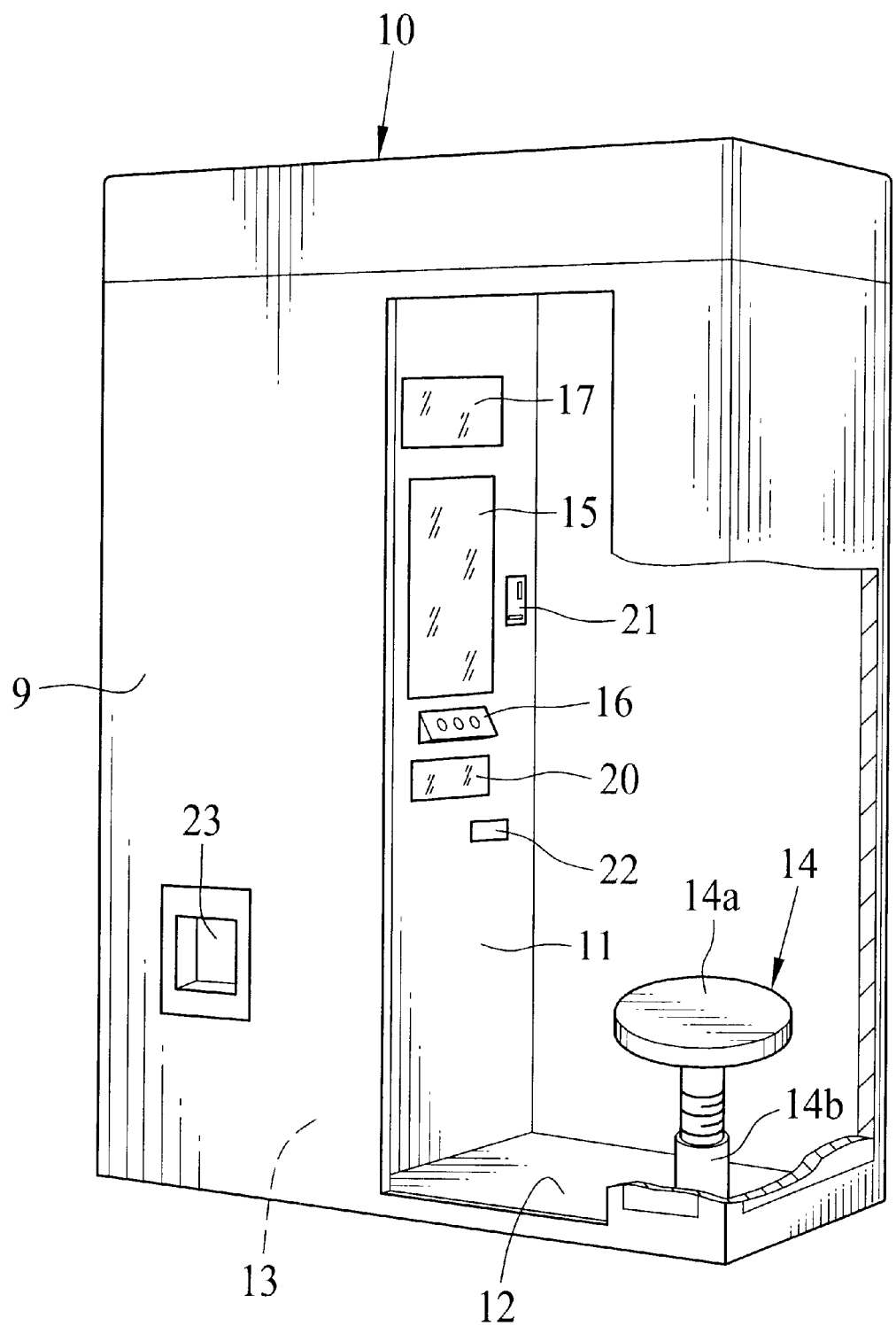
FIG. 1 is a perspective view, partly in cross section, of an automatic identification photograph producing apparatus.
Figure 2:
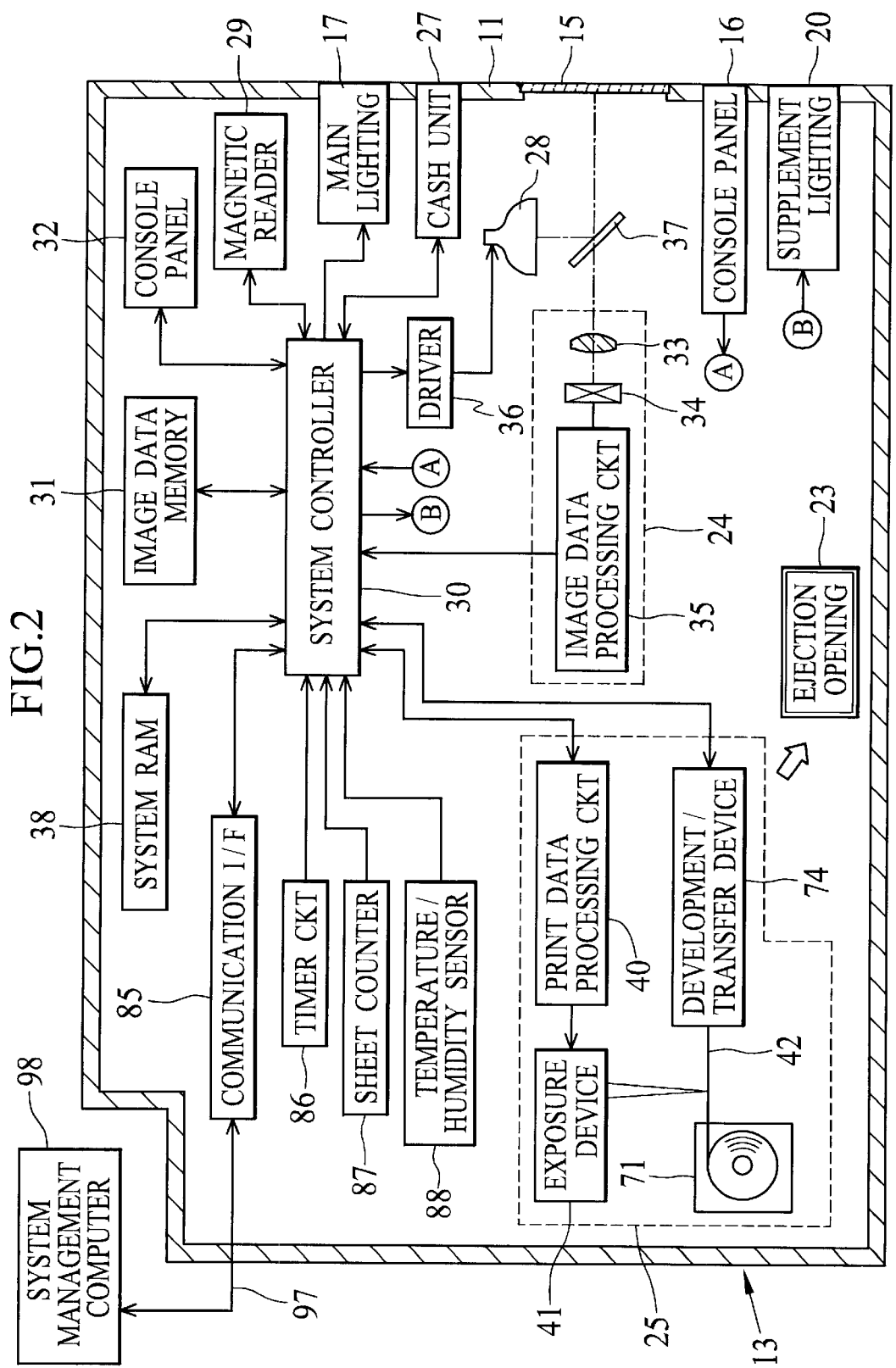
FIG. 2 is a block diagram of a photo making chamber.

In FIGS. 1 and 2, an identification photograph producing apparatus 10 has a housing 9, in which a photographing room 12 and a photo making chamber 13 are separated by a partition wall 11. The photographing room 12 is provided with a chair 14 on which a subject (a user) is seated. The chair 14 includes a seat portion 14a and a base portion 14b. Bottom end of the seat portion 14a is screwed to the base portion 14b, so the height of the top surface of the seat portion 14a may be adjusted by rotating the seat portion 14a.

The partition wall 11 has a taking window 15, a console panel 16, a cash insertion slot 21 and a change output opening 22. A main lighting 17 is disposed above the taking window 15. A supplement lighting 20 is disposed below the taking window 15. A back lighting (not shown) is provided on a rear wall of the photographing room 12. Each of the main lighting 17, supplement lighting 20 and a rear lighting has a white lamp, such as a halogen lamp or a fluorescent lamp, and usually emits light toward the subject. A photographed subject image, print order, charge order, etc., are displayed on the taking window 15. The console panel 16 is provided with an imaging button, a print button, a print size change button and so forth, and is manipulated by the user.

An ejection opening 23 is formed through the housing 9. A print picture is forwarded to the ejection opening 23, so the user can take the print picture therethrough.

In FIG. 2, a configuration of the photo making chamber 13 is depicted. The photo making chamber 13 is comprised of a camera section 24, a printer section 25, a cash unit 27, a display 28, a magnetic reader 29, a communication interface (I/F) 85, a timer circuit 86, a paper counter 87 and a temperature/humidity sensor 88, which are controlled by a system controller 30. The camera section 24 and the printer section 25 correspond, respectively, to an imaging section and a printing section of the present invention. The system controller 30 is connected to an image memory 31 for storing image data, a system RAM 38 for storing data concerning calibration condition and so forth, and an operation panel 32 manipulated in calibration. The system controller 30 is connected to a system management computer 98 through the communication I/F 85 and a communication circuit 97, and exchanges signals with the system management computer 98. As for the communication circuit 97, a well-known telephone circuit or a system-exclusive circuit is applicable. Moreover, it is possible to omit the communication circuit 97, and to exchange signals by use of wireless data transmission devices.

The cash unit 27 sums up money that is entered through the cash insertion slot 21, and sends a signal for starting imaging operation and printing operation to the system controller 30 when a predetermined charge is put in the apparatus. When loaded money amount is more than the predetermined charge, the system controller 30 sends a refund signal to the cash unit 27, which refunds change to the change output opening 22.

An electric still camera on the market is applicable to the camera section 24, which includes a taking lens 33, an imaging device 34 like a CCD, and an image data processing circuit 35. Subject light is focused on the imaging device 34 through the taking lens 33, and is converted into electric image signals. In the image data processing circuit 35, the image signals are converted into digital image data, which is sent to the system controller 30. Based on produced image data, the system controller 30 successively displays images on the display through a driver 36. Displayed image on the display 28 is reflected by the half mirror 37, to display the image on the taking window 15. In entering a print command, image data from the camera section 24 is temporarily stored in an image data memory 31.

The print section 25 includes a print data processing circuit 40, an exposure device 41, a photosensitive sheet 42 and a development/transfer device 74. The print data processing circuit 40 converts image data read out from the image data memory 31 into print signals. Based on the print signals, the exposure device 41 executes exposure to the photosensitive sheet 42, which is contained in a magazine 71 in a rolled manner. The development/transfer device 74 lays the photosensitive sheet 42 on an image receiving sheet after adding water onto the photosensitive sheet 42, and presses them with heat. Then, a positive image is transferred to the image receiving sheet. Afterwards, the development/transfer device 74 ejects the image receiving sheet as an identification photograph through the ejection opening 23.

Figure 3:
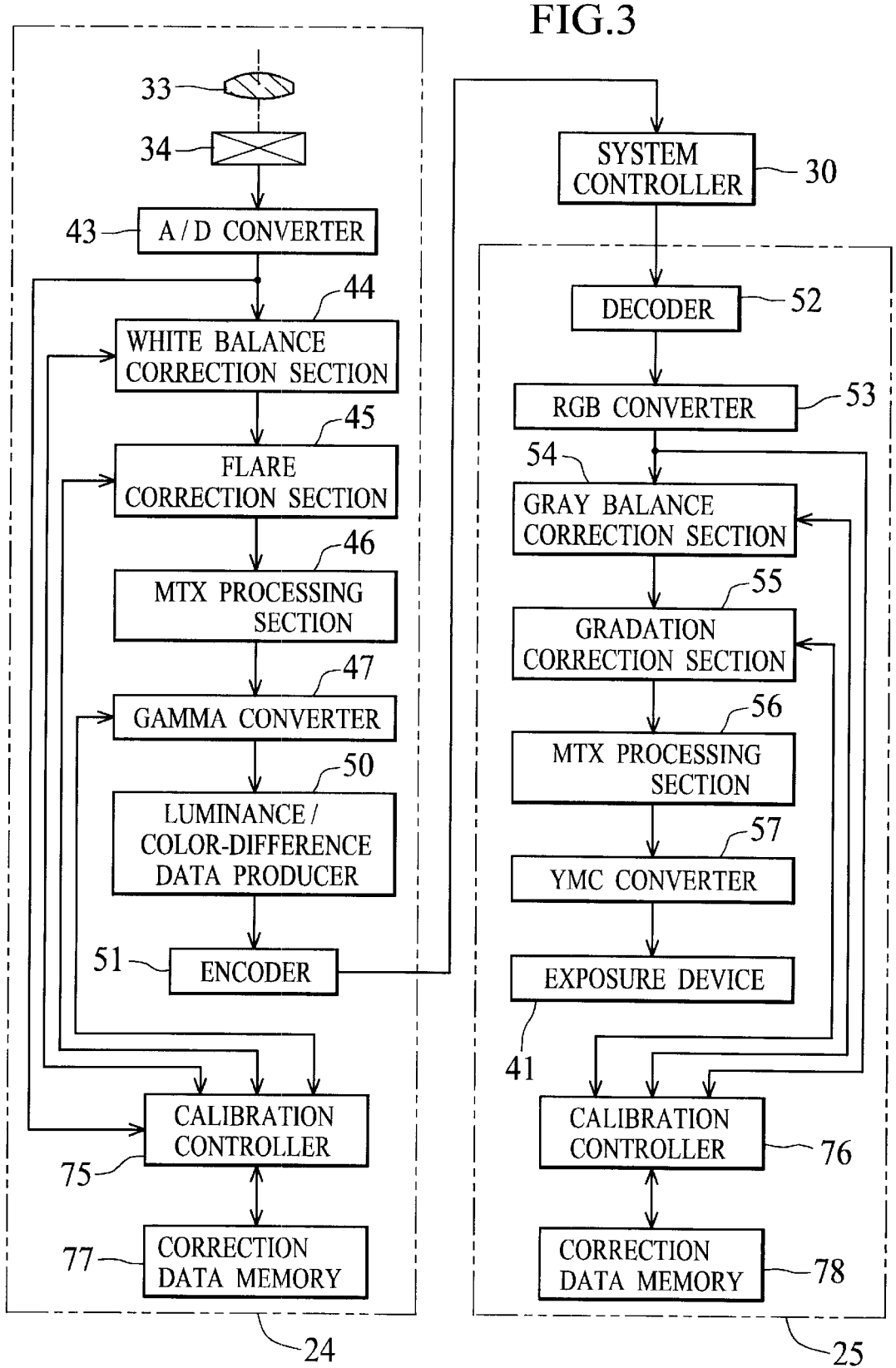
FIG. 3 is a block diagram showing an example of a camera section and a print section.

In FIG. 3, a block diagram of the camera section 24 and the print section 25 are depicted. Subject light is focused on the imaging device 34 through the taking lens 33, and is photoelectrically converted into electrical image signals. The image signals are sent to an A/D converter 43, and are digitally converted into image data of red, green and blue. Digital image data is sent to a white-balance (WB) correction section 44, in which gain coefficients of respective colors are multiplied to gradation values of image data of respective color, for the purpose of adjusting color balance. In calibration, gain coefficients of red and blue are corrected.

After WB correction, image data is sent to a flare correction section 45, in which data processing is performed to reduce the effect of increase in light amount caused by a flare. For example, red image data is subjected to the following calculation:

$$Rout = Rin - K \times \alpha$$

wherein Rin and Rout represent input value and output value of red image data, K is a constant value for preventing excessive correction, and α is a flare correction value. The constant value K is predetermined within a range from 0 to 1 by a camera manufacturer. Of course, green and blue image data is also subjected to the same process. The value α is the same in each color, and determined by the calibration.

After flare correction is completed, image data is sent to an MTX processing section 46, in which sensitivity characteristics of the imaging device 34 are corrected. Thereafter, image data is sent to a gamma conversion section 47, in which spectrum characteristics of the imaging device 34 are corrected by gradation conversion of respective color data. After these processes, image data of red, green and blue are converted into luminance and color-difference data in a luminance/color-difference data producer 50, and is sent to an encoder 51 to decrease data size. Compressed data is transferred to the print section 25 through the system controller 30.

In the print section 25, compressed image data is expanded by a decoder 52, to produce luminance and color-difference data. In an RGB converter 53, luminance and color-difference data is converted into original image data of red, green and blue, which is sent to the gray-balance correction section 54 to adjust color balance by multiplying gain coefficients. Afterward, gradation conversion is carried out in the gradation correction section 55 for having proper exposure in accordance with coloring characteristics of the photosensitive sheet 42.

Image data of primary colors (red, green and blue) is sent to a YMC converter 57 through an MTX converter 56, in which well-known color masking process is performed. In the YMC converter 57, image data of primary colors are converted into image data of complementary colors (yellow, magenta and cyan), which is forwarded to the exposure device 41.

Figure 4:
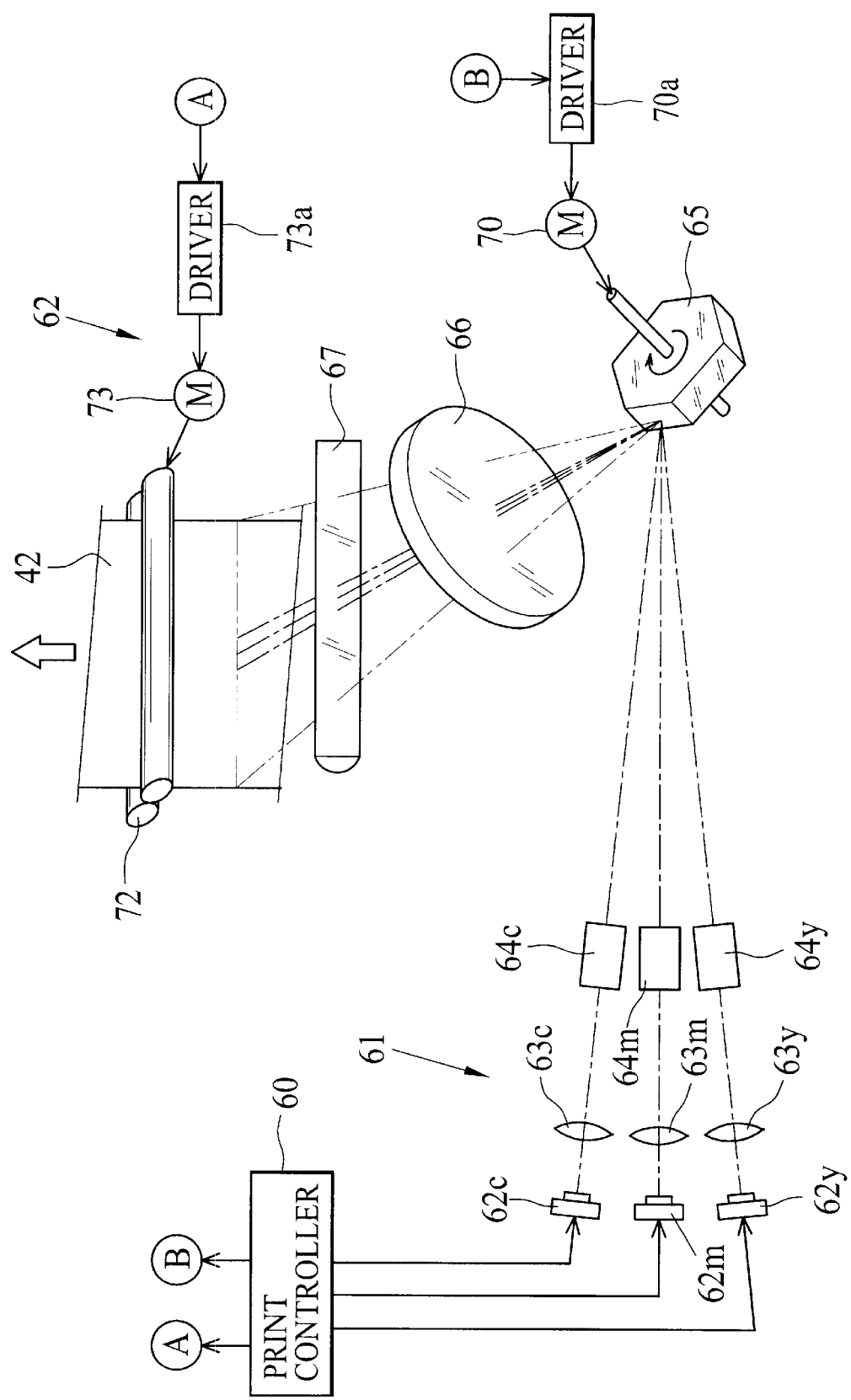
FIG. 4 is a schematic view of an exposure device.

As shown in FIG. 4, the exposure device 41 includes an optical scanner 61 and a sheet feeder 62. The optical scanner 61 has three kinds of laser diode (LD) 62c, 62m and 62y. The laser diodes 62c, 62m and 62y emit laser beam to form cyan, magenta and yellow latent images onto cyan, magenta and yellow coloring layers of the photosensitive sheet 42. Intensities of the laser beams of the laser diodes 62c, 62m and 62y are controlled by a print controller 60 in accordance with density value of the corresponding image data. Laser beams from the laser diodes 62c, 62m and 62y enter through collimator lenses 63c, 63m and 63y, cylindrical lenses 64c, 64m and 64y, a polygon mirror 65 and an fθ lens 66.

The polygon mirror 65 rotates at a high speed by a motor 70, and scans the laser beams in a width direction of the photosensitive sheet 42 (main scan direction). Laser beams are scanned by one line along the main scan direction while being reflected by one surface of the polygon mirror 65. The motor 70 is driven by the print controller 60 through a driver 70a. The fθ lens 66 and a cylindrical lens 67 comprise an optical focusing system, which focuses laser beams of three lines on different positions of photosensitive material 42 with respect to the main scan direction. Moreover, the print controller 60 has a delay circuit, which controls emission timing of laser beams of the laser diodes 62c, 62m and 62y to compensate differences of focusing positions. Thus, three laser beams of different color, adjusted their intensities according to gradation values of the same pixel, are focused on the same position on the photosensitive sheet 42, and latent pixel images of three colors are overlapped on the photosensitive sheet 42.

The photosensitive sheet 42 is drawn out from the magazine 71, and is nipped by a feeding roller set 72, which feeds the photosensitive sheet 42 in a sub scan direction perpendicular to the main scan direction. The print controller 60 controls rotation of the feeding roller set 72 through a motor 73 and a driver 73a. The photosensitive sheet 42 is intermittently advanced in the sub scan direction by one line each time one scanning in the main scan direction is completed. After exposure of one frame, an exposed area of the photosensitive sheet 42 is cut apart from the unexposed portion by a cutter (not shown). The exposed photosensitive sheet 42 is conveyed to the development/transfer section 74 (See FIG. 2) by the feeding roller set 72. In the development/transfer section 74, exposed photosensitive sheet 42 is tightly contacted to an image receiving sheet, and is heated. Thereby, an exposed image on the photosensitive sheet 42 is developed, and transferred to the image receiving sheet.

After peeling the photosensitive sheet 40, the image receiving sheet is ejected to the ejection opening 23 as a print picture.

Image quality of the print picture is deviated because of age-based deviation of constituent parts such as lighting equipments, of variation in print condition such as temperature or humidity, and of exchanging constituent parts such as lamps of the lighting equipments. In addition, difference in lot number of the photosensitive sheets 42 causes deviation in image quality. Thus, in order to correct such deviation, the camera section 24 and the print section 25 are calibrated by use of test charts. In FIG. 3, the image data processing circuit 35 includes a calibration controller 75 for performing calibration of the WB correction section 44, the flare correction section 45 and the gamma conversion section 46. The print data processing circuit 40 has a calibration controller 76 for carrying out calibration of the gray balance correction section 54 and the gradation correction section 55.

Figure 5:
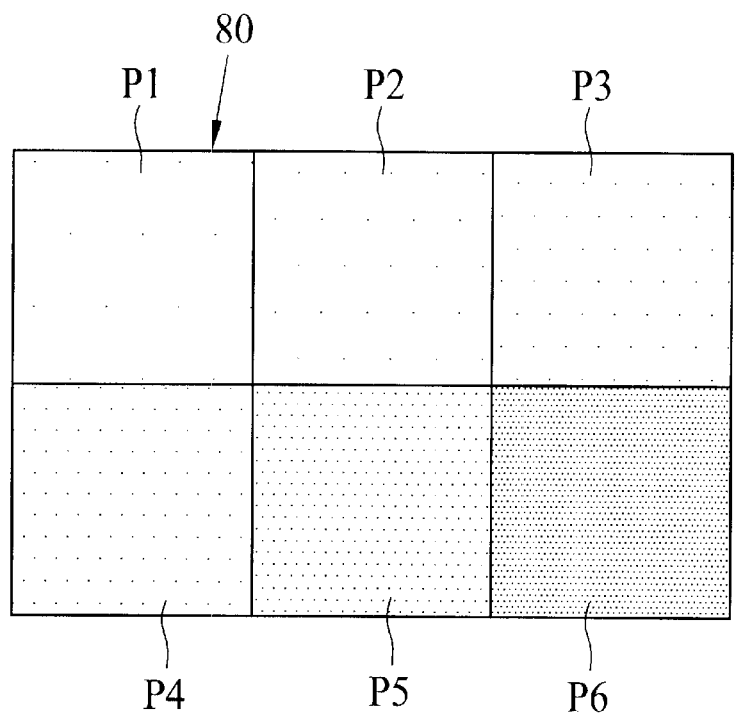
FIG. 5 is a top plan view of a camera test chart.

In FIG. 5, a camera test chart 80 is used in calibration of the camera section 24. The camera test chart 80 includes six patches (P1–P6) of achromatic color, called gray patches. Optical densities of these six gray patches P1–P6 are different from one another, and are increased as the patch number is increased. It is desirable that reflectance of the first patch P1 is equal to or more than 90%, and that reflectance of the sixth patch P6 is equal to or less than 5%. Accurate value of the reflectance of these six patches P1–P6 are prewritten in a correction data memory 77 that is connected to the calibration controller 75 of the camera section 24.

Figure 6:
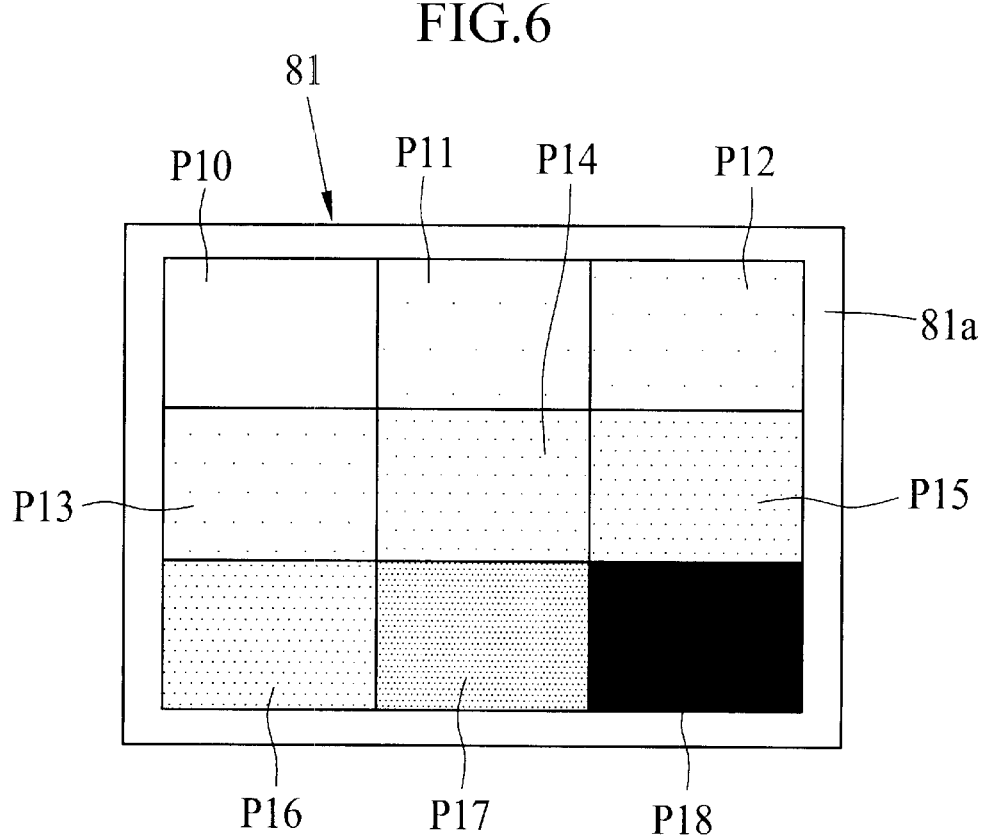
FIG. 6 is a top plan view of a printer test chart.

In FIG. 6, a printer test chart 81 is used in calibration of the printer section 25. The printer test chart 81 includes nine patches (P10–P18) of achromatic color. Optical densities of these patches P10–P18 are different, and are increased as the patch number is increased. The patch P10 and marginal area 81a of the printer test chart 81 is colored white, and the color of the patch P18 is black. The patch P14, positioned in the middle of the printer test chart 81, is used in calibration of the gray balance correction section 54. Optical density of the patch P14 is set to about 75%.

Figure 7:
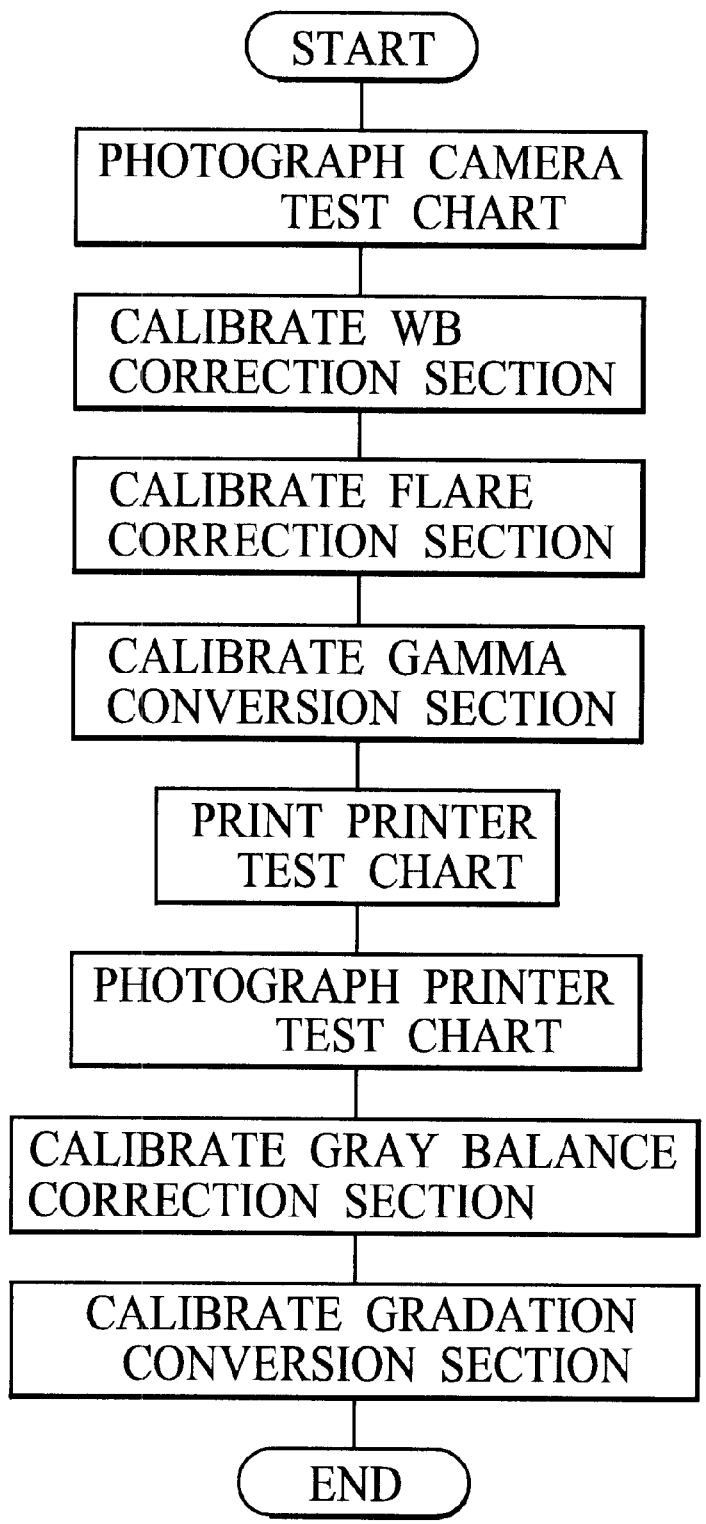
FIG. 7 is a flow chart showing an example of a sequence of calibration.

Next, with reference to FIG. 7, sequence of calibration will be described. The photograph producing apparatus 10 is usually set to an imaging mode, in which the camera section 24 photographs a subject, and in which the printer section 25 prints a picture based on image data of subject image. After opening a door of the photo making chamber 13, an operator manipulates the operation panel 32 to set a camera calibration mode. A chart holder (not shown) is set at a standard photograph position to face the taking window 15 above the chair 14.

Figure 8:
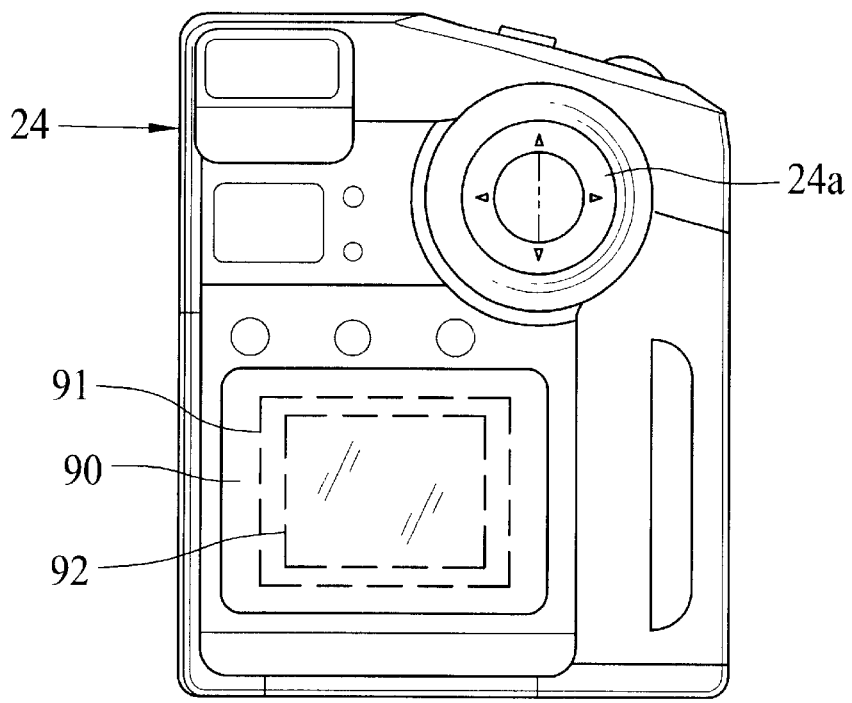
FIG. 8 is a rear elevation view of a camera section.

After setting the camera test chart 80 in the chart holder, the camera section 24 photographs the camera test chart 80. In FIG. 8, a rear side of the camera section 24 is provided with an LCD panel 90, on which the camera test chart 80 is displayed. In the LCD panel 90 is provided an outer guide frame 91 and an inner guide frame 92. The operator manipulates a zoom button 24a to adjust magnification such that the edge of the image of the camera test chart 80 is positioned between the outer and inner guide frames 91, 92. Thereby, it is possible to photograph respective patches with proper positions and sizes.

When the camera test chart 80 is photographed, the system controller 30 sends a calibration command to the calibration controller 75 of the camera section 24. And image data of the camera test chart 80 is transferred to the calibration controller 75 from the A/D converter 43. Thereby, image data of three color of the respective patches P1–P6 is stored in an internal memory.

The calibration controller 75 of the camera section 24 sends image data of patch P1 to the WB correction section 44, and reads the gradation values of output image data (R1, G1, B1) from the WB correction section 44. The calibration controller 75 performs the following calculation by use of original gain coefficients (Rgp, Ggp, Bgp), to produce corrected gain coefficients (Rgn, Ggn, Bgn):

Rgn=G1×Rgp/R1

Ggn=1

Bgn=G1×Bgp/B1

These corrected gain coefficients are written in an internal memory of the WB correction section 44.

Figure 9:
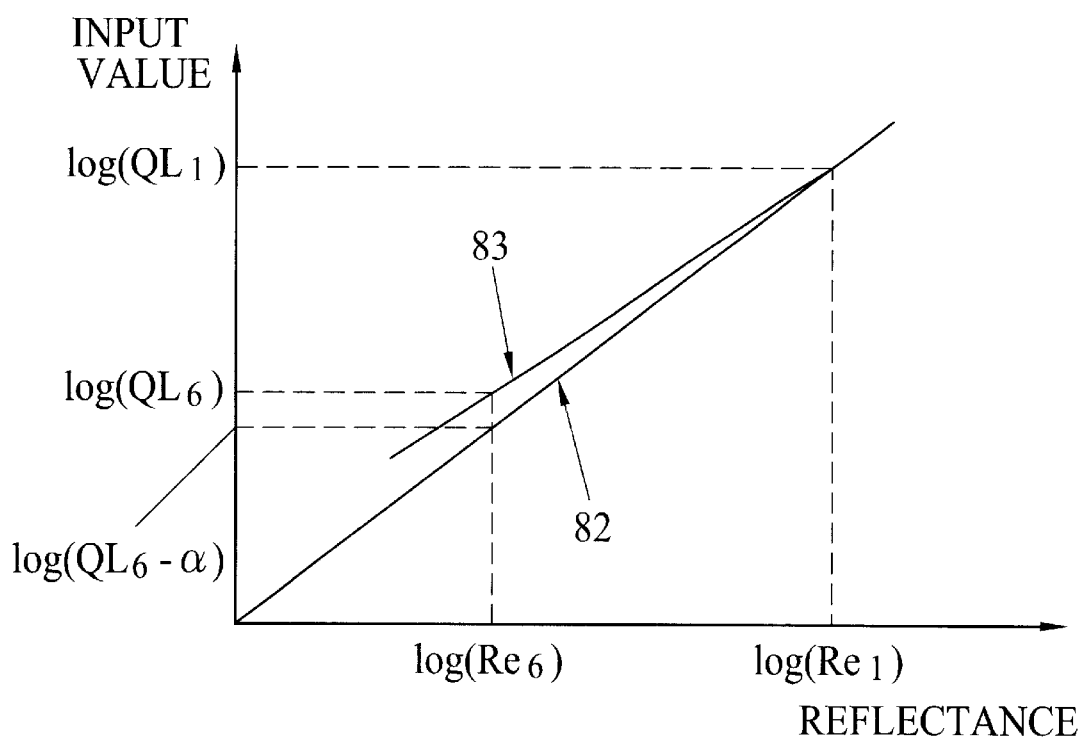
FIG. 9 is a graph showing a flare correction curve.

Next, the flare correction section 45 is calibrated. In this calibration, the flare correction value α is determined by use of green image data of the patches P1–P6 output from the calibrated WB correction section 44. Referring to the graph of FIG. 9, calibration method of the flare correction value α will be described. Horizontal axis shows reflectance in logarithm, wherein Re1 and Re6 indicate reflectance of the patches P1 and P6 respectively. Vertical axis shows input gradation value of green image data in logarithm, wherein QL1 and QL6 indicate gradation values of the patches P1 and P6 respectively.

When no flare occurs, the relationship between the reflectance and the gradation value of green image data is shown by a straight line 82. However, since the flare of incident light increases gradation value of green image data by α, practical relationship is shown by a curved line 83. Suppose that flare is too small to be ignored in imaging a patch with high reflectance, such as the patch P1, the following equation holds.

$$\log(\text{Re}1):\log(\text{Re}6)=\log(\text{QL}1):\log(\text{QL}6-\alpha)$$

Based on the above equation, the calibration controller 75 calculates the flare correction value α, which is written in an internal memory of the flare correction section 45.

Figure 10:
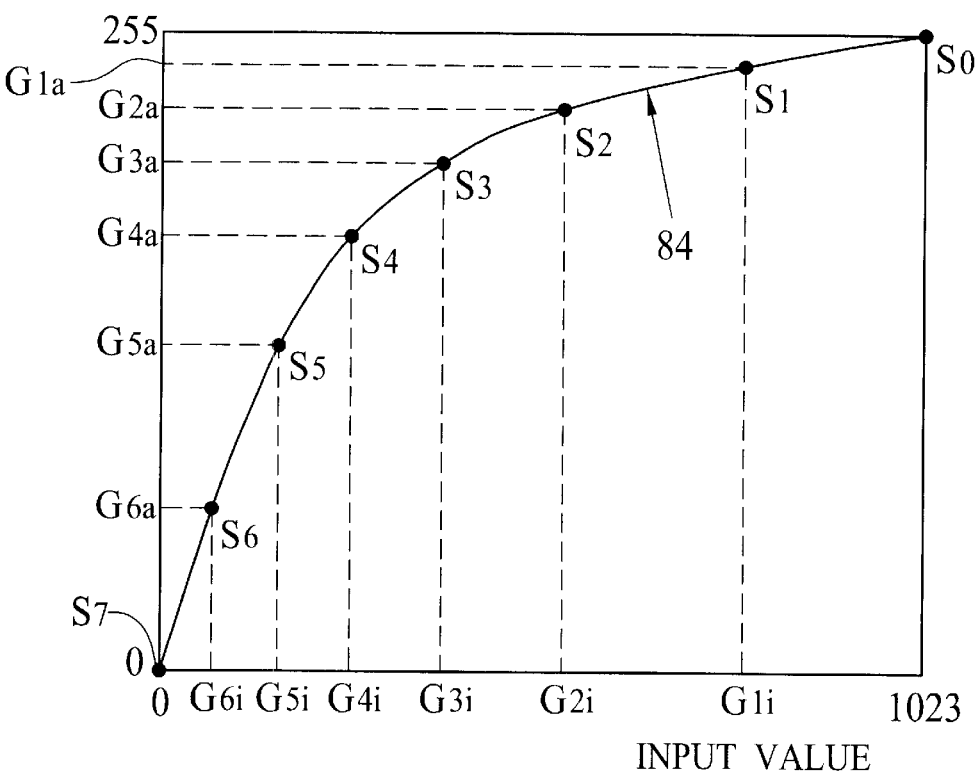
FIG. 10 is a graph showing a gamma conversion curve.

Lastly, gamma conversion section 47 is calibrated. In the gamma conversion section 47, 10-bit input gradation value is converted into 8-bit gradation value, which is output to the luminance/color-difference data producer 50. The calibration controller 75 of the camera section 24 inputs gradation values of green image data of the patches P1–P6 (G1$i$–G6$i$), after data processing in the WB correction section 44 and the flare correction section 45, which are already calibrated. Standard values of green image data of the patches P1–P6 (G1$a$–G6$a$) after gamma correction is stored in a correction data memory 77. As shown in FIG. 10, the standard values G1$a$–G6$a$ read out from the correction data memory 77 are plotted at points S1–S6 against the input values G1$i$–G6$i$. Moreover, a start point S0 and an end point S7 are included. Then, higher-order polynomial approximation is carried out by use of eight points S0–S8, to form a new gamma correction curve 84, which is stored in a table memory of the gamma correction section 47.

By these processes, calibration of the camera section 24 is completed. Next, the operator sets a printer calibration mode by manipulating the operation panel 32, and makes a print order to print the printer test chart 81. The system controller 30 reads out image data of printer test chart 81 from the image data memory 31, and sends it to the printer section 25 to print the image. When a printed image of the printer test chart 81, set in the chart holder, is photographed by the camera section 24, calibration of the printer section 25 is started. Image data of the printer test chart 81 is subjected to kinds of data correction process in the calibrated image data processing circuit 35, and is sent to the printer section 25 via the system controller 30. Compressed image data from the printer section 25 is decoded in the decoder 52, and is converted into ROB format data in the RGB converter 53. Then, image data is sent to the calibration controller 76 of the printer section 25, to store ROB gradation values of the patches P10–P18 in an internal memory.

The calibration controller 76 performs calibration of the gray-balance correction section 54. The calibration controller 76 reads out RGB gradation data of the patch P14 (R14, G14, B14), and carries out the following calculation to obtain new gain coefficients (Rg, Gg, Bg).

Rg=G14/R14

Gg=1

Bg=G14/B14

The obtained gain coefficients are stored in an internal memory of the gray balance correction section 54.

Figure 11:
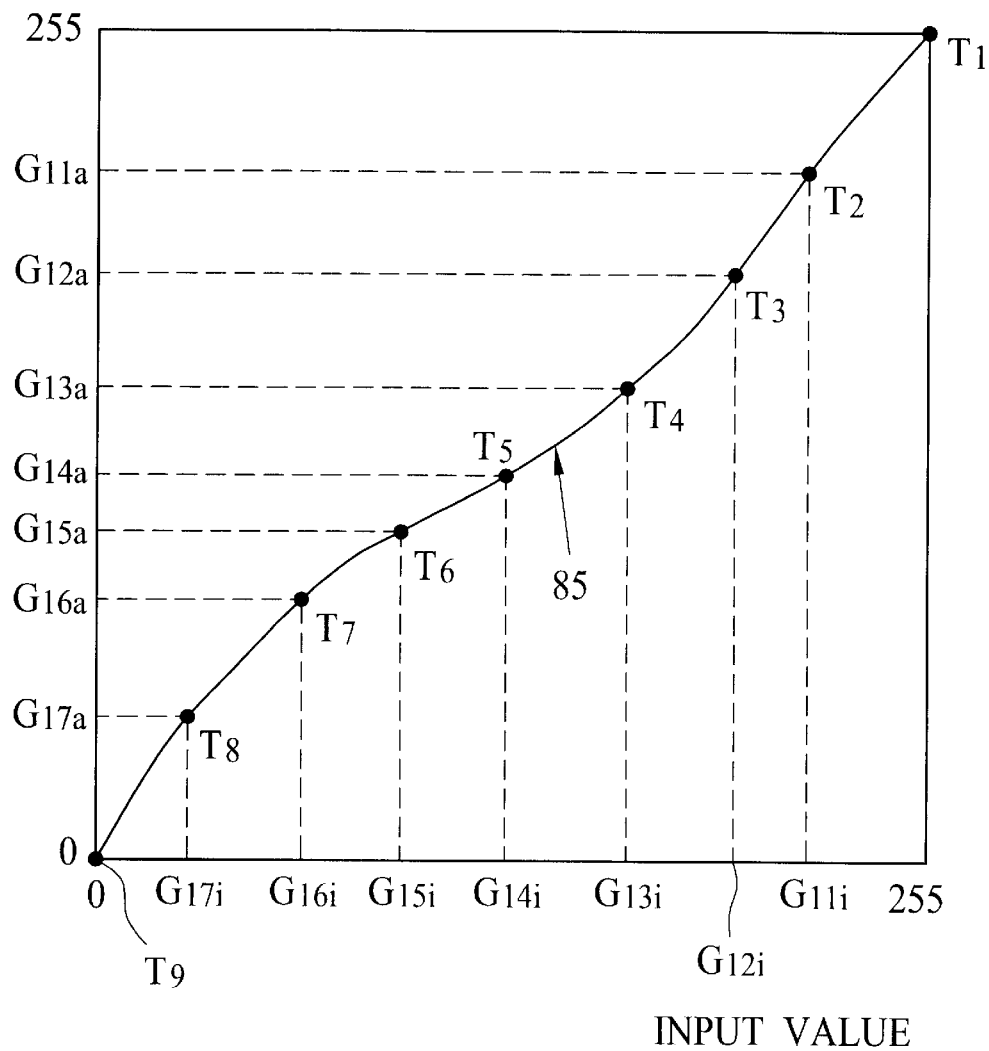
FIG. 11 is a graph showing a gradation correction curve.

Then, calibration of the gradation correction section 55 is carried out. The calibration controller 76 reads out green image data of the patches P11–P17 (G11$i$–G17$i$) after gray balance correction, and inputs it to the gradation correction section 55. Standard values of green image data of the patches P11–P17 (G11$a$–G17$a$) after gradation correction is stored in a correction data memory 78. As shown in FIG. 11, the standard values G11$a$–G17$a$, read out from the correction data memory 78, are plotted at points T2–T8 against the input values G11$i$–G17$i$. Moreover, a start point T1 and an end point T9 are included. Then, higher-order polynomial approximation is carried out by use of eight points T1–T9, to form a new gamma correction curve 85, which is stored in a table memory of the gradation correcting section 55. Thereby, calibration of the printer section 25 is completed.

The above described calibration operation is carried out when the photosensitive sheet 42 and lighting lamps are exchanged. The calibration operation is also executed when the photograph producing apparatus 10 satisfies certain calibration conditions. Examples of the calibration condition are an elapsed time from the latest calibration, a number of prints, and variation in temperature or humidity. Information concerning the calibration condition is written in the system RAM 38. Elapsed time, number of prints, and variation in temperature and humidity are always monitored respectively by use of the timer circuit 86, the sheet counter 87 and the temperature/humidity sensor 88. These information are sent to the system controller 30, which makes a comparison between these information and the calibration conditions stored in the system RAM 38. When the calibration condition is satisfied, the system controller 30 makes a calibration request signal.

This calibration request signal is sent to the system management computer 98 through the communication I/F 85 and the communication circuit 87. The system management computer 98 manages existence of calibration request signal from a plurality of photograph producing apparatuses 10. When receiving a calibration request signal, the system management computer 98 identifies the photograph producing apparatus 10 that has sent the calibration request signal, and urges calibration to a system manager or a maintenance section (an operator). When the photograph producing apparatus 10 sends calibration signal by elapse of predetermined time, it is possible to send calibration request signal before predetermined time has elapsed, in consideration of time for starting calibration after sending the calibration request signal.

Because of age-based variation and dirt, densities of patches of the camera test chart 80 and the printer test chart 81 are varied. In using such test charts, there is a possibility of incomplete calibration. Thus, the system RAM 38 has data concerning test chart exchange conditions such as an allowable utilization number of the test chart, and allowable optical densities of respective patches. In case of deciding the gradation value by averaging measured optical densities of plural areas in one patch, the system RAM 38 may contain data concerning allowable dispersion range of measured optical densities of plural areas, as a test chart exchange condition.

Data concerning utilization number of the test chart is stored in the system RAM 38. The utilization number is added by the system controller 30, each time calibration is executed. When the number is over the allowable utilization number, or when measured gradation values are over the allowable optical density range or the allowable dispersion range, the system controller 30 sends a test chart exchange request signal to the system management computer 98, and urges to exchange the test charts. In addition, the operation panel 32 may have a liquid crystal panel, on which a message for urging to exchange test chart is displayed. Thereby, it is possible to exchange test charts during calibration.

Information concerning optical densities, allowable optical density ranges and allowable dispersion ranges of all patches are magnetically recorded on the rear surface of the test charts. After exchange of test charts, these magnetic data are read out by the magnetic reader 29, and stored in the system RAM 38. Instead of recording magnetically, optical density data may be recorded in an IC chip that is provided in the test charts. Optical density data may be recorded as bar code data, and read out by use of a bar code reader provided with the photo making chamber 13. Moreover, optical density data may be printed on rear surfaces of the test charts. In that case, the operator inputs optical density data by manipulating the operation panel 32.

Just before calibration, or in unfavorable photography condition, image quality of a print image seems to be deteriorated. In such cases, it is preferable to suspend utilization in the taking mode for a while. The system RAM 38 has suspension condition data to define conditions for suspending utilization in the taking mode. Examples of suspension conditions are elapse of certain time after sending a calibration request signal, shortage of the photosensitive sheet 42, trouble of the apparatus, deviation in temperature or humidity from predetermined allowable range. When at least one of these conditions is satisfied, the system controller 30 suspends utilization in the taking mode, and displays a message to indicate suspension of utilization on the display 28.

Moreover, the system controller 30 transfers data for representing suspension of utilization in the taking mode and data for identifying a reason, to the system management computer 98 through the communication I/F 85 and the communication circuit 97. The system management computer 98 calculates the time needed for the operator to reach the photograph making apparatus 10, and time to carry out calibration or maintenance. Also the system management computer 98 calculates the time to start utilization in the taking mode, and transfers data for representing the restart time to the system controller 30, which displays the restart time on the display 28 based on data from the system management computer 98. The system controller 30 may calculate the restart time.

Next, operation of the image forming apparatus of the above configuration will be described. In making an identification photograph, charge for producing the photograph is inserted into the charge insertion slot 21. When the cash unit 27 detects insertion of charge, message for urging a user to prepare for photography is displayed on the taking window 15. The user is seated on the chair 14 properly, and orders the system controller 30 to carry out photography by use of the console panel 16. After a short while, the system controller 30 sends imaging order to the camera section 24, which photographs the upper portion of the user's body. Image data obtained by photography is subjected to data correction process, such as WB correction and gamma conversion, in the image data processing circuit 35. After data correction, image data is stored in the image data memory 31, and also sent to the driver 26 to display the subject image on the display 28. Subject image on the display 28 is shown in the taking window 15 through the half mirror 37.

The user manipulates the console panel 16 to enter a print order after confirmation of subject image displayed on the taking window 15. The system controller 30 reads out image data from the image data memory 31, and transfers it to the print section 25. The print section 25 drives the exposure device 41 to expose the image onto the photosensitive sheet 42 after gray balance correction and gradation correction in the print data processing circuit 40. When the image is printed, the photosensitive sheet 42 is cut away by the cutter. In the development/transfer device 74, a positive image is transferred to the image receiving sheet, so a print picture is ejected to the ejection opening 23.

The camera section 24 and the printer section 25 are subjected to calibration when the apparatus 10 is repaired, or when the lighting lamps or the photosensitive sheet 42 is exchanged. Moreover, when calibration conditions, such as elapse of time or deviation in temperatures, the calibration request signal is forwarded to the system management computer 98 from the system controller 30, which displays messages for indicating suspension of utilization in the taking mode and re-start time on the display 28.

The operator manipulates the operation panel 32 to set to the camera calibration mode, and photographs the camera test chart 80 in the chart holder. Then, on the basis of the photographed image, the calibration controller 75 of the camera section 24 performs calibration of the WB correction section 44, the flare correction section 45 and the gamma conversion section 47.

After calibration of the camera section 24 is completed, the operator manipulates the operation panel 32 to set to the printer calibration mode, and prints the printer test chart 81. Thereafter, the operator fixes the printed printer test chart 81 in the chart holder, and photographs the test chart 81 by use of the calibrated camera section 24. Then, the calibration controller 76 of the printer section 25 carries out calibration of the gray balance correction section 54 and the gradation correction section 55, based on image data transferred from the camera section 24.

When the test charts 80, 81 are used in calibration at many times, or when the test charts 80, 81 have dust or flow on the front surfaces, the system controller 30 sends the test chart exchange request signal to the system management computer 98, or displays the message on the LCD panel in the operation panel 32. Thereby, effective calibration is carried out by use of test charts that are not deviated in optical densities.

Figure 12:
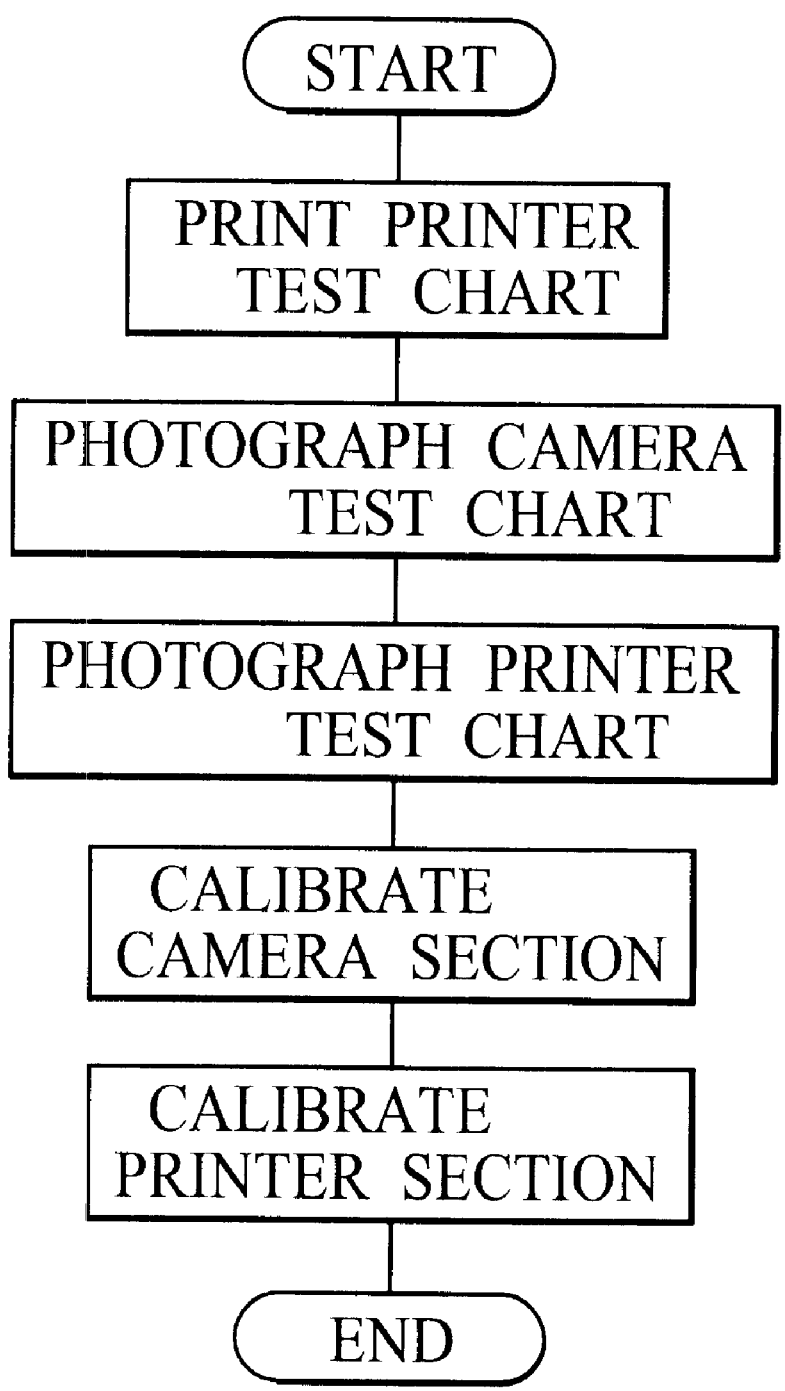
FIG. 12 is a flow chart showing an another example of a sequence of calibration.

In the above embodiment, two test charts 80, 81 are separately photographed in calibration, but these test charts 80, 81 may be photographed at the same time. In FIG. 12, after the print test chart 81 is printed, the camera and printer test charts 80, 81 are photographed successively. Image data of the test charts 80, 81 are stored in the internal memory of the calibration controller 75. Next, by use of image data of the camera test chart 80, calibration of the camera section 24 is performed. And image data of the printer test chart 81 is sent to the printer section 25 from the calibrated camera section 24. Afterward, calibration of the printer section 25 is executed in the same way as the above embodiment. Since calibration is executed with one photography operation, it is possible to save labor of the operator.

Figure 13:
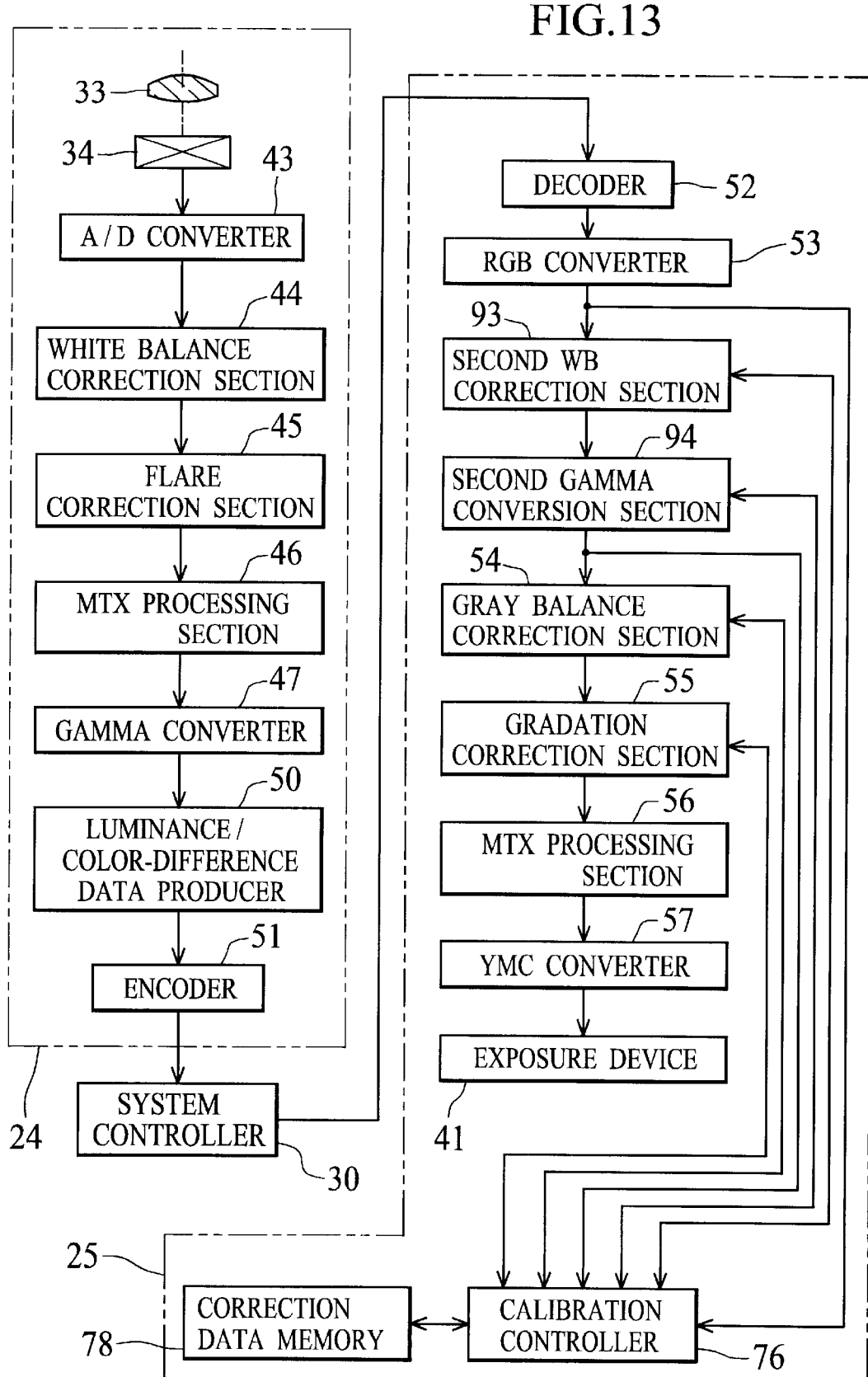
FIG. 13 is a block diagram showing an another example of a camera section and a print section.

FIG. 13 shows a flow chart of another example, in which the printer section 25 performs calibration of the camera section 24. The printer section 25 includes a second WB correction section 93 for correcting age-based deviation in white balance characteristics, and a second gamma conversion section 94 for correcting deviation in gamma conversion characteristic. The WB correction section 44 and the gamma conversion section 47 of the camera section 24 are not calibrated. The printer section 25 may be provided with a second flare correction section to correct variation in flare correction characteristics in the flare correction section 45.

In photography of the camera test chart 80, the calibration controller 76 reads out image data from the RGB converter 53, and R gain coefficient (Rgp'), G gain coefficient (Ggp') and B gain coefficient (Bgp') from an internal memory of the second WB correction section 93. The calibration controller 76 calculates new gain coefficients (Rgn', Ggn', Bgn') in the same method as the above embodiment, and writes them in the internal memory. By correcting white balance characteristic by use of the new gain coefficients (Rgn', Ggn', Bgn'), it is possible to correct age-based variation.

In photographing the camera test chart 80, the calibration controller 76 produces gamma correction table and writes it in a table memory of the second gamma correction section 94, in the same method as above. The calibration controller 76 executes calibration of the printer section 25 by use of the printer test chart 81, in the same way as above.

Thereby, it is possible to have effective calibration even when an electronic still camera with no calibration function is used as the camera section 24. On the other hand, the camera section 24 may have a second gray balance correction section and a second gradation correction section, which are calibrated by the calibration controller 75 of the camera section 24.

Figure 14:
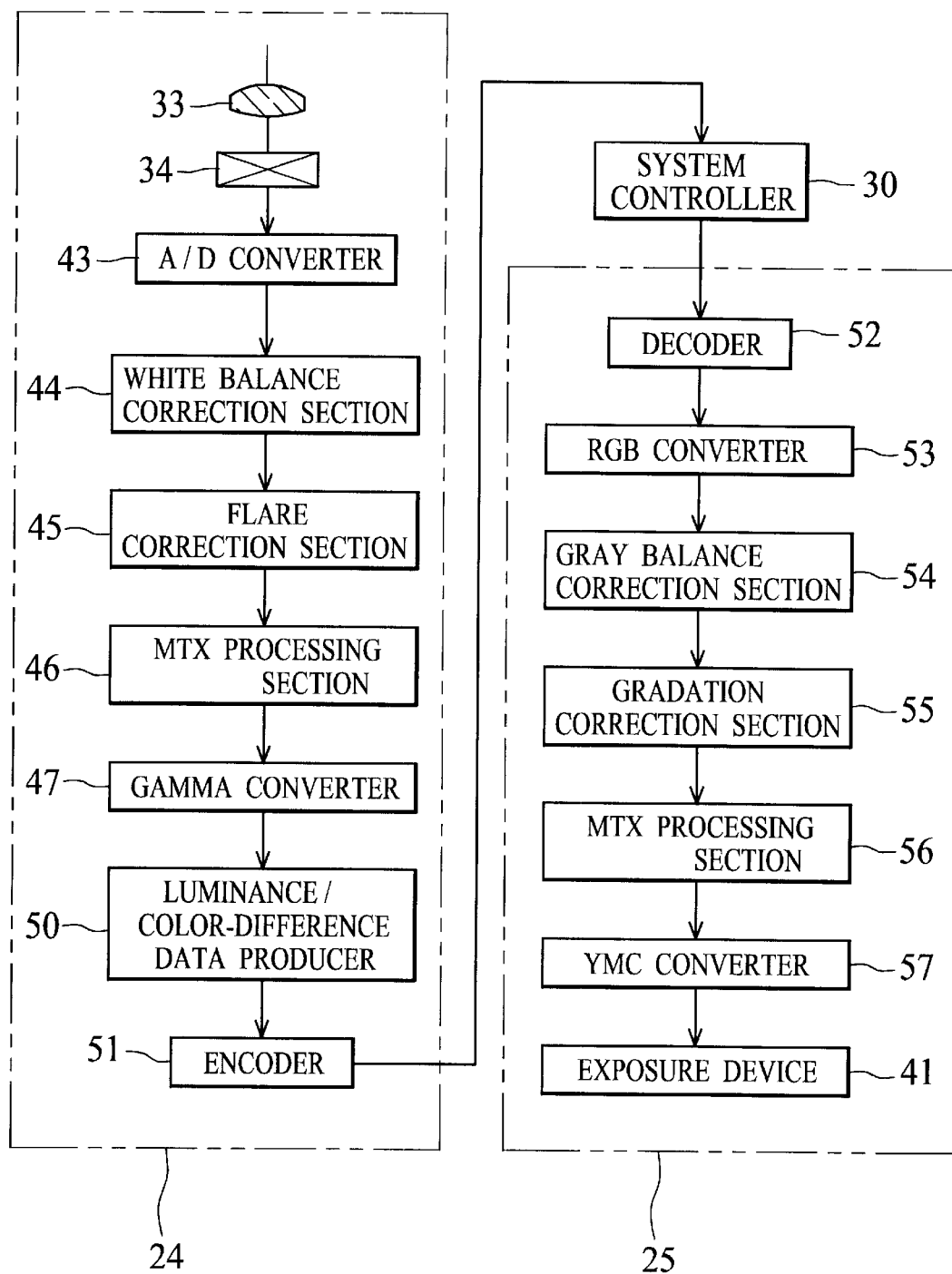
FIGS. 14 and 15 are block diagrams showing a further example of a camera section and a print section.
Figure 15:
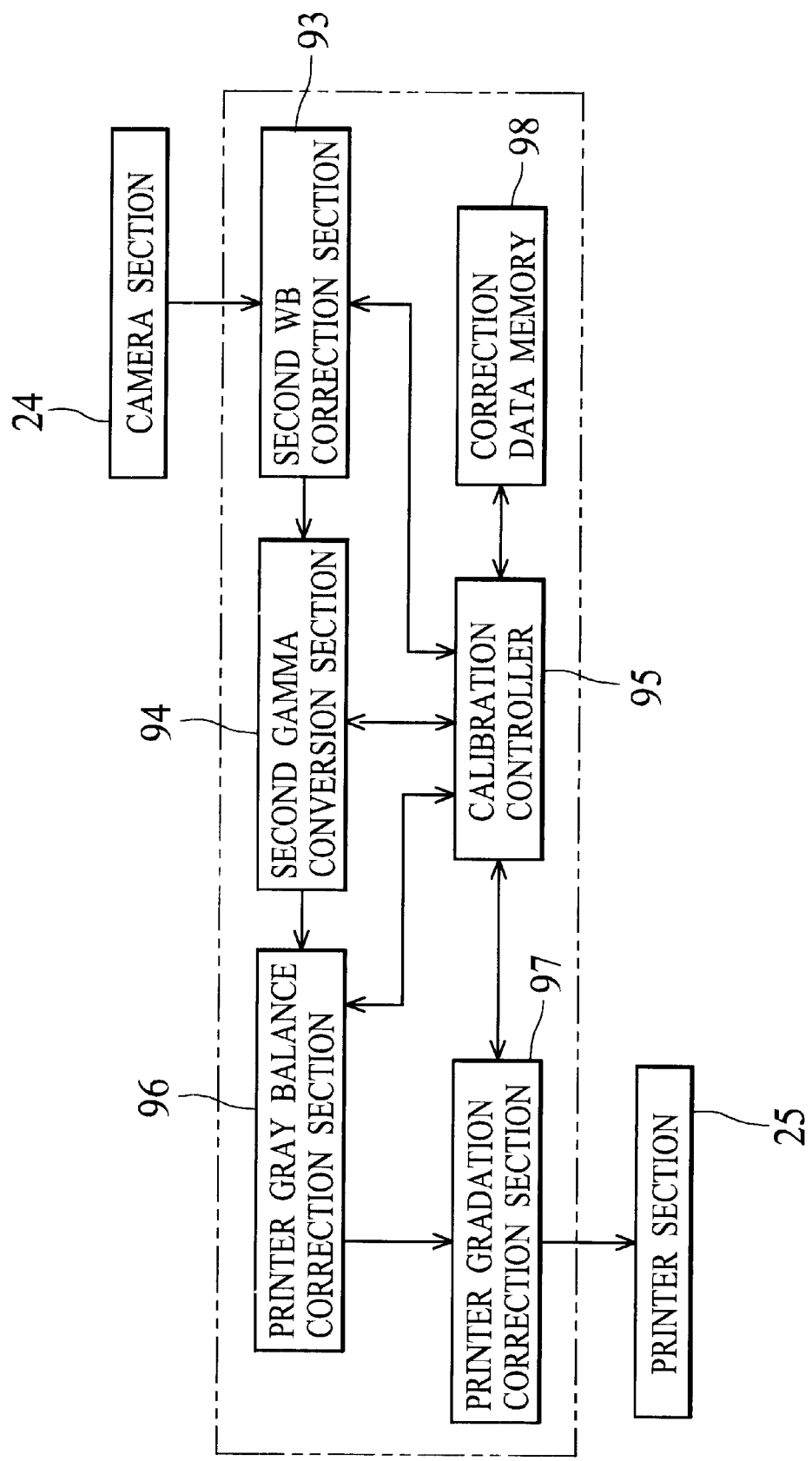

FIGS. 14 and 15 show a flow chart of an example to carry out calibration by the system controller 30. In this embodiment, the calibration controllers 75, 76 are omitted, and the system controller 30 is provided with a calibration controller 95, which is connected to the second WB correction section 93 and the second gamma conversion section 94. Elements the same as the above embodiment are indicated by the same reference numerals as those shown in FIG. 13. In FIG. 14, a printer gray balance correction section 96 for correcting variation in gray balance correction characteristics, a printer gradation correction section 97 for correcting variation in gradation correction characteristics, and a correction data memory 98 having standard data are used in calibration.

In photography of the camera test chart 80, calibration of white balance characteristics and gamma conversion characteristics is carried out. Then, in photographing the printer test chart 81, calibration of gray balance characteristics and gradation correction characteristics is carried out.

The test charts may include chromatic color patches, such as a macbeth color chart. It is possible to use the color patches for performing calibration of conversion parameters used in the MTX processing sections 46, 56, in the luminance/color-difference data producer 50, and in the RGB converter 53.

In the above embodiments, an electric still camera on the market is used as the camera section 24. But it is possible to use an electric still camera of an exclusive type, which is limited its function for the image forming apparatus of the present invention. In that case, the luminance/color-difference data producer 50, the encoder 51, the decoder 52 and the RGB converter 53 may be omitted.

In the above embodiment, subject image is recorded by applying laser beams onto a photosensitive material, but it is possible to perform image recording by use of other type of printing devices, such as a thermal transfer type, an ink-jet type, a thermal sublimation type.

Thus, the present invention is not to be limited to the above embodiments, but on the contrary, various modifications are possible to those skilled in the art without departing from the scope of claims appended hereto.

What is claimed is:

1. An image forming apparatus comprising:

photographing means for photographing a subject and outputting image data of a subject image;

printing means for printing said subject image on the basis of said image data from said photographing means;

a first test chart used in calibration of said photographing means;

a second test chart used in calibration of said printing means; and calibration means for correcting deviation in photography characteristics of said photographing means and deviation in printing characteristic of said printing means, said calibration means driving said photographing means to photograph said first test chart, executing calibration of said photographing means on the basis of image data of said first test chart, driving said photographing means to photograph said second test chart that is printed by driving said printing means, and executing calibration of said printing means on the basis of image data of said second test chart.

2. An apparatus as claimed in claim 1, wherein said apparatus is changeable between a taking mode for photographing and printing a subject image, and a calibration mode for carrying out calibration of said photographing means and said printing means.

3. An apparatus as claimed in claim 1, wherein said calibration means is provided in at least one of said photographing means and said printing means.

4. An apparatus as claimed in claim 3, wherein said photographing means executes white balance correction process, flare correction process, and gamma conversion process to said image data obtained by photography, wherein said calibration means adjusts correction parameters used in said white balance correction process, said flare correction process, and said gamma conversion process.

5. An apparatus as claimed in claim 3, wherein said printing means executes gray balance correction process and gradation conversion process, wherein said calibration means adjusts correction parameters used in said gray balance correction process and said gradation conversion process.

6. An apparatus as claimed in claim 3, wherein each of said first and said second test charts comprises plural gray patches, optical densities of said gray patches being different from one another.

7. An apparatus as claimed in claim 3, wherein said photographing means has guide frames to set said first and said second test charts at appropriate positions.

8. An apparatus as claimed in claim 3, wherein said image forming apparatus is a photograph producing apparatus for photographing a person who is sitting at a predetermined position, and for producing a photo print of said person.

9. An apparatus as claimed in claim 3, further comprising:
   a memory for storing calibration condition data to determine condition to carry out calibration of said photographing means and said printing means;
   detection means for detecting whether or not said calibration condition is satisfied; and
   output means for outputting a calibration request signal to an external apparatus when said calibration condition is satisfied.

10. An apparatus as claimed in claim 3, further comprising:
    a memory for storing test chart exchange condition data to determine condition to exchange said first and second test charts;
    detection means for detecting whether or not said test chart exchange condition is satisfied; and
    output means for outputting a test chart exchange request signal to an external apparatus when said test chart request condition is satisfied.

11. An apparatus as claimed in claim 3, further comprising:
    a memory for storing utilization suspension condition data to determine condition to suspend utilization in said taking mode;
    detection means for detecting whether or not said utilization suspension condition is satisfied; and
    display means for displaying message to notify suspension in said taking mode when said utilization suspension condition is satisfied;
    wherein said apparatus suspends utilization in said taking mode when said utilization suspension condition is satisfied.

12. An apparatus as claimed in claim 11, further comprising:
    signal transfer means for outputting an utilization suspension signal to an external apparatus when said utilization suspension condition is satisfied, said signal transfer means inputting a restart time signal to identify restart time in taking mode from said external apparatus;
    wherein said display means displays restart time in said taking mode on the basis of said restart time signal.

13. The apparatus of claim 1, wherein the calibration of the printing means using said second test chart follows calibration of the photographing means using said first test chart.

14. The apparatus of claim 13, wherein the second test chart is printed by said printing means prior to calibration of the printing means.

15. An image forming apparatus comprising:
    photographing means for photographing a subject and outputting image data of a subject image;
    printing means for printing said subject image on the basis said image data from said photographing means;
    a first test chart used in calibration of said photographing means;
    a second test chart used in calibration of said printing means; and
    calibration means for correcting deviation in photography characteristics of said photographing means and deviation in printing characteristic of said printing means, said calibration means driving said photographing means to photograph said first test chart and said second test chart that is printed by said printing means, executing calibration of said photographing means on the basis of image data of said first test chart, and executing calibration of said printing means on the basis of image data of said second test chart.

16. An apparatus as claimed in claim 15, wherein said apparatus is changeable between a taking mode for photographing and printing a subject, and a calibration mode for carrying out calibration of said photographing means and said printing means.

17. An apparatus as claimed in claim 15, wherein said calibration means is provided in at least one of said photographing means and said printing means.

18. An apparatus as claimed in claim 17, wherein said photographing means executes white balance correction process, flare correction process, and gamma conversion process to said image data obtained by photography,
    wherein said calibration means adjusts correction parameters used in said white balance correction process, said flare correction process, and said gamma conversion process.

19. An apparatus as claimed in claim 17, wherein said printing means executes gray balance correction process and gradation conversion process,
    wherein said calibration means adjusts correction parameters used in said gray balance correction process and said gradation conversion process.

20. An apparatus as claimed in claim 17, wherein said first and said second test charts is comprised of plural gray patches, optical densities of said gray patches being different from one another.

21. An apparatus as claimed in claim 17, wherein said photographing means has guide frames to set said first and said second test charts at appropriate positions.

22. An apparatus as claimed in claim 17, wherein said image forming apparatus is a photograph producing apparatus for photographing a person who is sitting at a predetermined position, and for producing a photo print of said person.

23. An apparatus as claimed in claim 17, further comprising:
    a memory for storing calibration condition data to determine condition to carry out calibration of said photographing means and said printing means;
    detection means for detecting whether or not said calibration condition is satisfied; and
    output means for outputting a calibration request signal to an external apparatus when said calibration condition is satisfied.

24. An apparatus as claimed in claim 17, further comprising:
    a memory for storing test chart exchange condition data to determine condition to exchange said first and second test charts;
    detection means for detecting whether or not said test chart exchange condition is satisfied; and
    output means for outputting a test chart exchange request signal to an external apparatus when said test chart request condition is satisfied.

25. An apparatus as claimed in claim 17, further comprising:
    a memory for storing utilization suspension condition data to determine condition to suspend utilization in said taking mode;

detection means for detecting whether or not said utilization suspension condition is satisfied; and display means for displaying message to notify suspension in said taking mode when said utilization suspension condition is satisfied;

wherein said apparatus suspends utilization in said taking mode when said utilization suspension condition is satisfied.

26. An apparatus as claimed in claim 25, further comprising:

signal exchange means for outputting an utilization suspension signal to an external apparatus when said utilization suspension condition is satisfied, said signal exchange means inputting a restart time signal to identify restart time in taking mode from said external apparatus;

wherein said display means displays restart time in said taking mode on the basis of said restart time signal.

27. A method for calibrating an image forming apparatus with a photographing means and a printing means, said method comprising steps of:

photographing a first test chart by use of said photographing means;

executing calibration of said photographing means based on image data of said first test chart obtained by photography;

printing a second test chart by use of said printing means;

photographing a second test chart by use of said photographing means; and executing calibration of said printing means based on image data of said second test chart obtained by photography.

28. A method as claimed in claim 27, wherein at least one of said photographing means and said printing means includes a calibration means for executing calibration of said photographing means and said printing means.

29. A method as claimed in claim 27, wherein said photographing means is calibrated by adjusting correction parameters used in white balance correction process, flare correction process and gamma conversion process to said image data.

30. A method as claimed in claim 27, wherein said printing means is calibrated by adjusting correction parameters used in gray balance correction process and gradation correction process to said image data.

31. A method for calibrating an image forming apparatus with a photographing means and a printing means, said method comprising steps of:

photographing a first test chart and a second test chart by use of said photographing means after printing said second test chart by use of said printing means;

executing calibration of said photographing means based on image data of said first test chart obtained by photography;

executing calibration of said printing means based on image data of said second test chart obtained by photography.

32. A method as claimed in claim 31, wherein at least one of said photographing means and said printing means includes a calibration means for executing calibration of said photographing means and said printing means.

33. A method as claimed in claim 31, wherein said photographing means is calibrated by adjusting correction parameters used in white balance correction process, flare correction process and gamma conversion process to said image data.

34. A method as claimed in claim 31, wherein said printing means is calibrated by adjusting correction parameters used in gray balance correction process and gradation correction process to said image data.

* * * * *